Patented Apr. 21, 1942

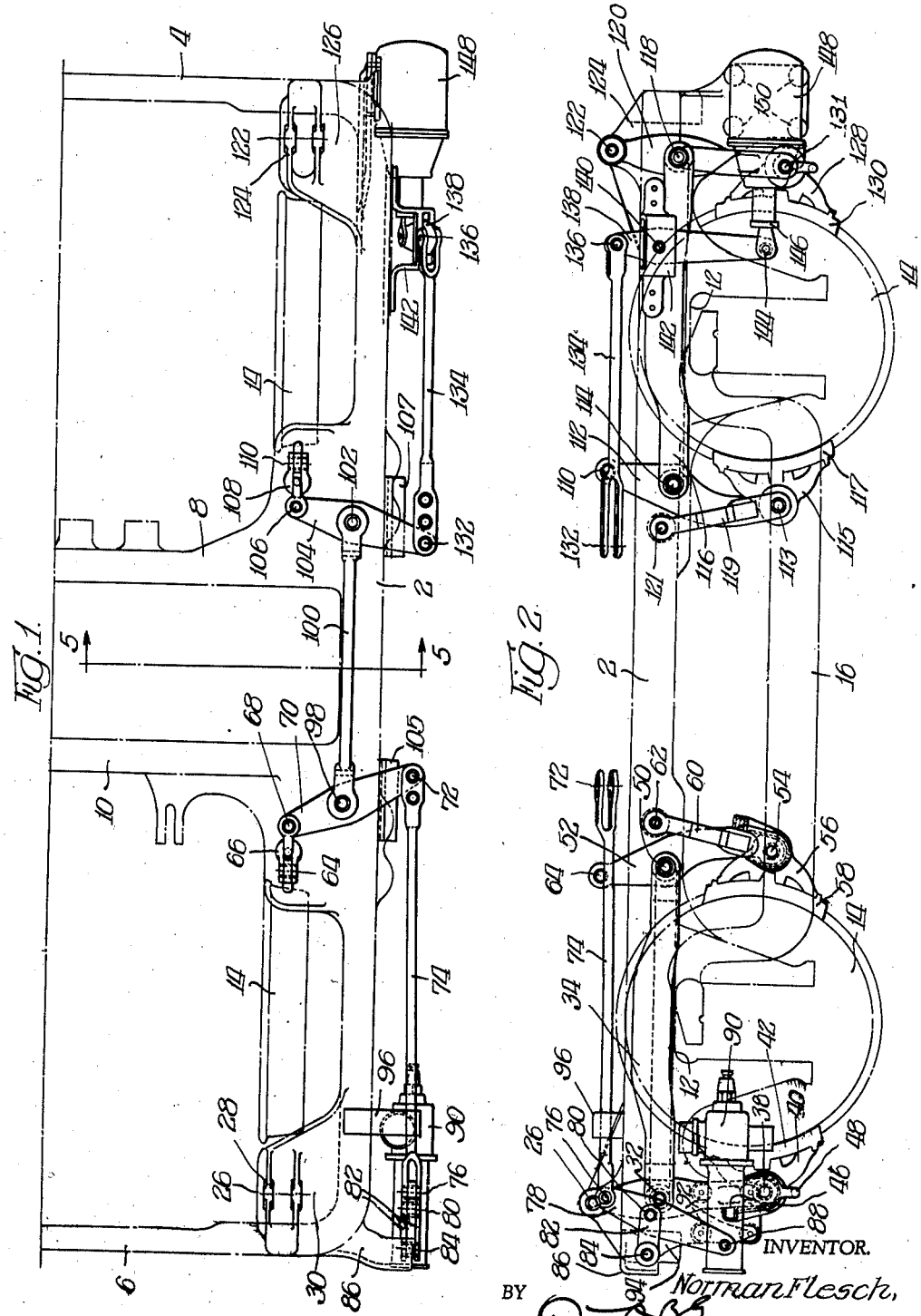

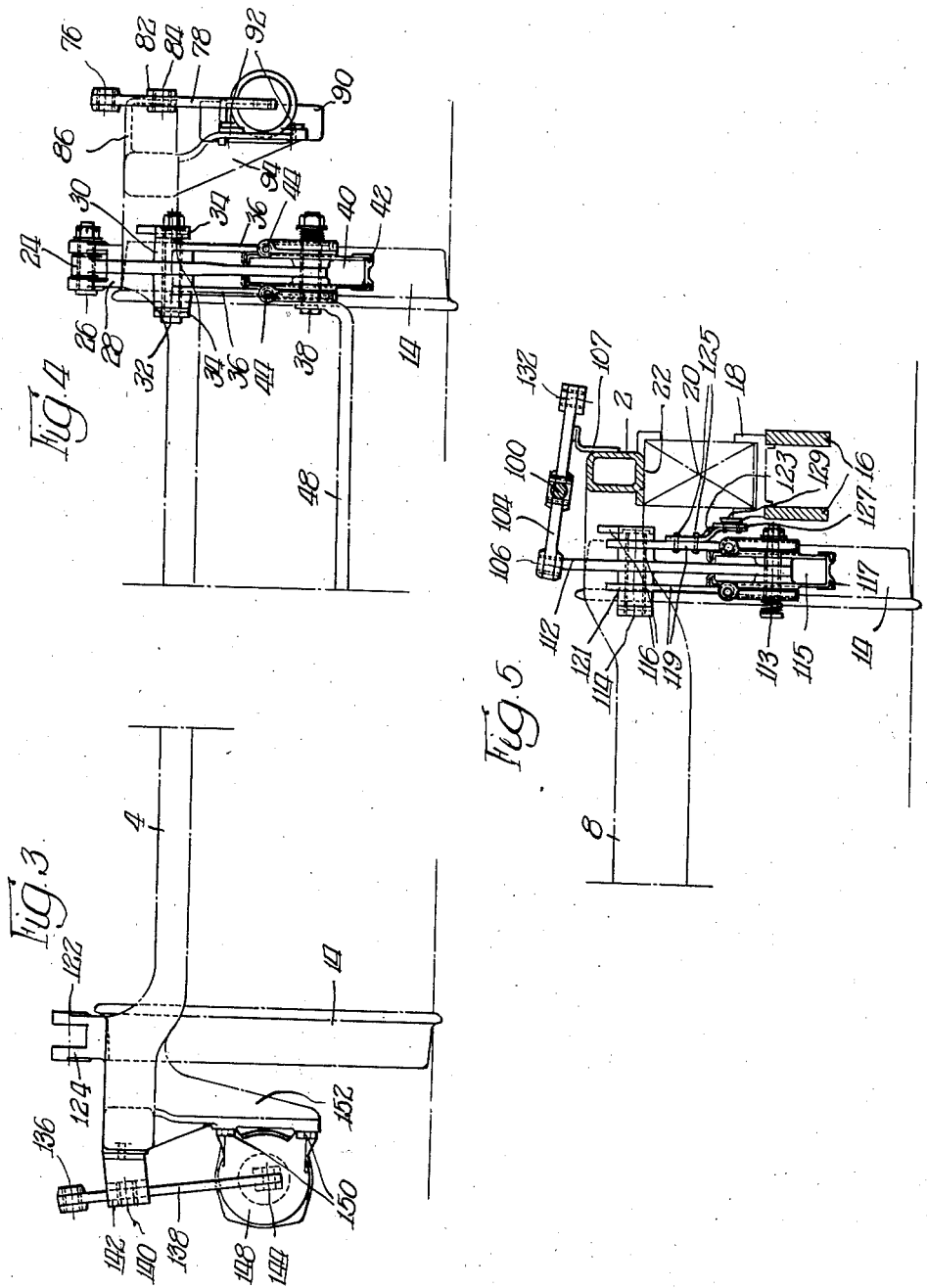

2,280,754

UNITED STATES PATENT OFFICE 2,280,754

BRAKE ARRANGEMENT

Norman Flesch, Chicago, Ill., assignor to American Steel Foundries, Chicago, Ill., a corporation of New Jersey Application July 26, 1940, Serial No. 347,608

21 Claims. (Cl. 188—56)

My invention relates to a clasp brake arrangement for a railway car truck and to such design of brake arrangement commonly designated unit cylinder wherein power means is supported on the car truck instead of the car body.

An object of my invention is to design a clasp brake arrangement for a four wheel railway car truck wherein the power means will be mounted on opposite corners at one end of the truck for actuation of the brake rigging at each side of the truck, and slack adjuster means mounted on opposite corners at the other end of the truck for automatic take-up of slack developed in the rigging during operation. In certain types of modern high speed passenger cars it is impracticable to mount the power means on the upper portions of the car truck, and I have designed a novel arrangement wherein the power means as well as the slack adjuster means may be carried approximately at the level of the wheel center at a sufficient height to afford the necessary clearances and in such position as to accommodate present novel car body arrangements as well as to assure maximum space between the wheels for motors or other accessories.

My arrangement has as an object a brake arrangement of relatively simple design utilizing hanger levers at the ends of the truck and hangers intermediate the wheels with straps extending over the axles and with a minimum of rigging intermediate the wheels comprising a single pull rod adjacent the transverse center line of the truck at each side thereof. In this manner I have afforded maximum clearance conditions intermediate the wheels inasmuch as the single pull rod at each side of the truck extending therebetween is adjacent the side member of the truck frame and occupies a minimum of space.

Figure 1 is a top plan view of a car truck and brake arrangement embodying my invention, only one-half the truck and brake structure being shown inasmuch as the arrangement is similar at opposite sides of the truck.

Figure 2 is a side elevation of the truck and brake arrangement shown in Figure 1. Figure 3 is a fragmentary end elevation thereof, the view being taken from the right as seen in Figures 1 and 2.

Figure 4 is an end elevation taken from the left as seen in Figures 1 and 2, and Figure 5 is a sectional view taken substantially at the transverse center line of the truck in the vertical plane indicated by the line 5—5 of Figure 1.

For the sake of clarity, in each of the figures certain details are omitted where they are more clearly set forth in other figures. Describing my novel structure in detail, the truck frame is conventional in form having the side member 2, integrally formed end members 4 and 6, as well as integrally spaced transoms 8 and 10 between which may be received the car body supporting bolster (not shown) in the usual manner. Each side member 2 is afforded adjacent its opposite ends pedestal jaw openings 12, 12 affording the normal means of connection to spaced wheel and axle assemblies 14, 14 through the medium of journal boxes (not shown) and upon said boxes may be supported the paired equalizers 16, 16, said equalizers 16, 16 affording support for the spring seat 18, (Figure 5) upon which may be carried the spring group diagrammatically indicated at 20, said spring group affording resilient support as at 22 for the side member 2.

The brake arrangement comprises the hanger lever 24 fulcrumed at its upper end as at 26 from the up-right bracket 28 integrally formed with the gusset 30 adjoining the end rail 6 and the side rail 2 at the end of the frame. The dead hanger lever 24 (Figure 4) is of novel form with the trunnion 30 intermediate its ends affording a pivotal connection as at 32 for the pair of straps 34, 34, and below said trunnion the hanger lever 24 has the integrally formed lateral hanger members 36, 36, said hanger members as well as the main leg of the hanger lever 24 being afforded a pivotal connection as at 38 to the brake head 40 with the associated brake shoe 42. At the pivotal point 38 are also supported balancing means 44, 44 of well-known form, each of said balancing means having abutment as at 46 (Figure 2) against the adjacent hanger member 36. Brake heads 40, 40 are held in normal spaced relationship by the tie bar 48 which is connected at the pivotal points 38, 38 at opposite sides of the truck.

The straps 34, 34 extend on opposite sides of adjacent wheel and axle assemblies and are pivotally connected at their opposite ends as at 50 to a point intermediate the ends of the live truck lever 52, and the lower end of said live truck lever 52 is pivotally connected as at 54 to the brake head 56 affording support for the associated brake shoe 58. Support for the rigging at this point is afforded by the paired hangers 60, 60 hung at their upper ends as at 62 from the side member 2, and connected at their lower ends to the pivotal point 54 already described.

The upper end of the live truck lever 52 has a pivotal connection as at 64 to the clevis means 66 whose opposite end is pivotally connected as at 68 to the horizontal dead cylinder lever 70.

The outer end of the dead cylinder lever 70 has a pivotal and adjustable connection as at 72 to the pull rod 74 whose opposite end has a pivotal connection as at 76 to the upper end of the slack adjuster lever 78, said slack adjuster lever having a pivotal connection intermediate its ends as at 80 to the link member 82 which is fulcrumed at its outer end as at 84 from the downturned end of the bracket 86 which is integrally formed with the frame at the juncture of the side member 2 with the end rail 6. The lower end of the slack adjuster lever 78 is adjustably fulcrumed as at 88 from the automatic slack adjuster 90, said slack adjuster lever being afforded support as at 92, 92 from a depending bracket 94 also integrally formed on the end of the frame below the juncture of the end rail 2. The pull rod 74 is afforded support and guidance adjacent its outer end from the bracket 96 conveniently mounted on top of the side member 2.

Intermediate the ends of the dead cylinder lever 70 is pivotally connected as at 98 the pull rod 100, said pull rod overlying the side member 2 and having its opposite end pivotally connected as at 102 to the horizontal live cylinder lever 104 whose inboard end has a pivotal connection as at 106 to the clevis means 108, and the opposite end of said clevis means has a pivotal connection as at 110 to the live truck lever 112. The live and dead cylinder levers 70 and 104 are afforded support and guidance at their outboard ends by the angle brackets 105 and 107 secured on the side rail 2. At the lower end of the live truck lever 112 is pivotally connected as at 113 the brake head 115 with the associated brake shoe 117, and support for the rigging at this point is provided in the form of paired hangers 119, 119 (Figure 5) having their lower ends connected at the pivotal point 113 and their upper ends hung as at 121 from the side rail 2. Additional guidance for the rigging is afforded at this point by the angled bracket 123 secured as at 125 to the outboard hanger 119 and afforded a wear plate at its lower outboard end as at 127 for guidance against the face plate 129 afforded on the spring seat 18. Intermediate the ends of the live truck lever 112 is pivotally connected at 114 the inboard and outboard straps 116, 116 which extend over the axle at opposite sides adjacent the wheel and have their opposite ends pivotally connected as at 118 to a point intermediate the ends of the dead hanger lever 120 generally similar in form to the dead hanger lever 24 at the opposite end of the truck. The hanger lever 120 is fulcrumed at its upper end as at 122 from the raised bracket 124 integrally formed with the gusset 126 at the corner of the frame. At the lower end of the dead hanger lever 120 is pivotally and adjustably supported as at 131 the brake head 128 and the associated brake shoe 130.

The outboard end of the live cylinder lever 104 has a pivotal and adjustable connection as at 132 to the pull rod 134 whose opposite end is pivotally connected as at 136 to the upper end of the vertical auxiliary lever 138, said auxiliary lever being fulcrumed intermediate its ends as at 140 from the bracket 142 conveniently secured on the outboard face of the side member 2. The lower end of the vertical auxiliary lever 138 has a pivotal connection as at 144 to the piston rod 146 of the power means or cylinder 148, said cylinder being supported as at 150, 150 from the bracket 152 integrally formed with the frame below the juncture of the side member 2 with the end rail 4.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a frame comprising side members and end rails, spaced supporting wheel and axle assemblies, brackets suspended from the corners of said frame at opposite ends thereof, power means supported from said brackets at one end of said frame, slack adjuster means supported from said brackets at the opposite end of said frame, and brake rigging for each side of the truck comprising hanger levers supporting brake heads and brake shoes outwardly of the wheels, hangers supporting live truck levers with brake heads and brake shoes intermediate the wheels, straps connecting the hanger levers and live truck levers associated with each wheel, and interconnected live and dead cylinder levers connected at their inboard ends to said live truck levers and operatively connected at their outboard ends respectively to said power means and slack adjuster means, the connection between said dead cylinder lever and said slack adjuster comprising a vertically disposed dead slack adjuster lever swingably fulcrumed intermediate its ends from said frame and connected at its lower end to said slack adjuster, and an operative connection between the upper end of said slack adjuster lever and said dead cylinder lever.

2. In a brake arrangement for a railway car truck, a frame comprising side members and end rails, spaced supporting wheel and axle assemblies, brackets suspended from the corners of said frame at opposite ends thereof, power means supported from said brackets at one end of said frame, slack adjuster means supported from said brackets at the opposite end of said frame, and brake rigging for each side of the truck comprising hanger levers supporting brake heads and brake shoes outwardly of the wheels, hangers supporting live truck levers with brake heads and brake shoes intermediate the wheels, straps connecting the hanger levers and live truck levers associated with each wheel, and interconnected live and dead cylinder levers connected at their inboard ends to said live truck levers and operatively connected at their outboard ends respectively to said power means and slack adjuster means, the connection between said live cylinder lever and said power means comprising a vertical auxiliary lever fulcrumed on the side of said frame and connected at its lower end to said power means, and a pull rod connected between said auxiliary lever and said live cylinder lever, and the connection between said slack adjuster and said dead cylinder lever comprising a vertically arranged dead lever swingably fulcrumed from said frame.

3. In a brake arrangement for a railway car truck, a frame comprising side members and end rails, spaced supporting wheel and axle assemblies, brackets suspended from the corners of said frame at opposite ends thereof, power means supported from said brackets at one end of said frame, slack adjuster means supported from said brackets at the opposite end of said frame, and brake rigging for each side of the truck comprising hanger levers supporting brake heads and brake shoes outwardly of the wheels, hangers supporting live truck levers with brake heads and brake shoes intermediate the wheels, straps connecting the hanger levers and live truck levers associated with each wheel, and interconnected live and dead cylinder levers connected at their inboard ends to said live truck levers and operatively connected at their outboard ends respectively to said power means and slack adjuster means, the connection between said power means and said live cylinder lever comprising a dead auxiliary lever fulcrumed intermediate its ends from said frame and connected at its lower end to said power means, and a pull rod adjustably connected between said live cylinder lever and said auxiliary lever, and the connection between said slack adjuster and said dead cylinder lever comprising a dead auxiliary lever swingably fulcrumed intermediate its ends from said frame.

4. In a brake arrangement for a railway car truck, a frame comprising side members and end rails, spaced supporting wheel and axle assemblies, brackets suspended from the corners of said frame at opposite ends thereof, power means supported from said brackets at one end of said frame, slack adjuster means supported from said brackets at the opposite end of said frame, and brake rigging for each side of the truck comprising hanger levers supporting brake heads and brake shoes outwardly of the wheels, hangers supporting live truck levers with brake heads and brake shoes intermediate the wheels, straps connecting the hanger levers and live truck levers associated with each wheel, and interconnected live and dead cylinder levers connected at their inboard ends to said live truck levers and operatively connected at their outboard ends respectively to said power means and slack adjuster means, and a pull rod operatively and adjustably connected between said slack adjuster means and said dead cylinder lever, said last-mentioned connection comprising a vertically arranged auxiliary lever swingably fulcrumed intermediate its ends from said frame.

5. In a brake arrangement for a railway car truck, a frame, spaced supporting wheel and axle assemblies, power means and slack adjuster means supported on one side of said frame at opposite ends thereof, and brake rigging comprising hanger levers supported outwardly of said wheels, live truck levers supported intermediate said wheels, straps connecting the levers associated with each wheel, live and dead cylinder levers connected to each other and connected to the live truck levers respectively, and operative connections between said live and dead cylinder levers and said power means and slack adjuster means respectively, the connection between said dead cylinder lever and said slack adjuster comprising link means pivotally connected at one end to said frame, a vertically disposed slack adjuster lever swingably fulcrumed from the opposite end of said link means and connected at its lower end to said slack adjuster, and a pull rod adjustably connected between said slack adjuster lever and said dead cylinder lever.

6. In a brake arrangement for a railway car truck, a frame, spaced supporting wheel and axle assemblies, power means and slack adjuster means supported on one side of said frame at opposite ends thereof, and brake rigging comprising hanger levers supported outwardly of said wheels, live truck levers supported intermediate said wheels, straps connecting the levers associated with each wheel, live and dead cylinder levers connected to each other and connected to the live truck levers respectively, and operative connections between said live and dead cylinder levers and said power means and slack adjuster means respectively, the connection between said power means and said live cylinder lever comprising a vertical dead auxiliary lever fulcrumed intermediate its ends from said frame, a pull rod adjustably connected between said live cylinder lever and the upper end of said auxiliary lever, and a pivotal connection at the lower end of said auxiliary lever to said power means, and the connection between said slack adjuster means and said dead cylinder lever comprising a dead auxiliary lever swingably fulcrumed from said frame, and a pull rod connected between said auxiliary lever and said dead cylinder lever.

7. In a brake arrangement for a railway car truck, a frame, spaced supporting wheel and axle assemblies, power means and slack adjuster means supported on one side of said frame at opposite ends thereof, and brake rigging comprising hanger levers supported outwardly of said wheels, live truck levers supported intermediate said wheels, straps connecting the levers associated with each wheel, live and dead cylinder levers connected to each other and connected to the live truck levers respectively, and operative connections between said live and dead cylinder levers and said power means and slack adjuster means respectively, the connection between said dead cylinder lever and said slack adjuster comprising a vertically disposed slack adjuster lever fulcrumed intermediate its ends from said frame and having an automatically adjustable connection at its lower end to said slack adjuster, and a pull rod operatively and adjustably connected between said slack adjuster lever and said dead cylinder lever.

8. In a brake arrangement for a railway car truck, a frame, spaced supporting wheel and axle assemblies, power means and slack adjuster means supported on one side of said frame at opposite ends thereof, and brake rigging comprising hanger levers supported outwardly of said wheels, live truck levers supported intermediate said wheels, straps connecting the levers associated with each wheel, live and dead cylinder levers connected to each other and connected to the live truck levers respectively, and operative connections between said live and dead cylinder levers and said power means and slack adjuster means respectively, the connection between said dead cylinder lever and said slack adjuster comprising a vertically disposed dead slack adjuster lever swingably fulcrumed intermediate its ends from said frame and connected at its lower end to said slack adjuster, and an operative connection between said slack adjuster lever and said dead cylinder lever in the form of an adjustable pull rod.

9. In a brake arrangement for a railway car truck, a frame, spaced supporting wheel and axle assemblies, power means and slack adjuster means supported on one side of said frame at opposite ends thereof, and brake rigging comprising hanger levers supported outwardly of said wheels, live truck levers supported intermediate said wheels, straps connecting the levers associated with each wheel, live and dead cylinder levers connected to each other and connected to the live truck levers respectively, and operative connections between said live and dead cylinder levers and said power means and slack adjuster means respectively, the connection between said dead cylinder lever and said slack adjuster comprising a vertically disposed slack adjuster lever fulcrumed intermediate its ends from said frame and having an automatically adjustable connection at its lower end to said slack adjuster, and an operative connection between said slack adjuster lever and said dead cylinder lever.

10. In a brake arrangement for a railway car truck, a frame, spaced supporting wheel and axle assemblies, power means and slack adjuster means supported on one side of said frame at opposite ends thereof, and brake rigging comprising hanger levers supported outwardly of said wheels, live truck levers supported intermediate said wheels, straps connecting the levers associated with each wheel, live and dead cylinder levers connected to each other and connected to the live truck levers respectively, and operative connections between said live and dead cylinder levers and said power means and slack adjuster means respectively, the connection between said dead cylinder lever and said slack adjuster comprising a vertically disposed dead slack adjuster lever swingably fulcrumed intermediate its ends from said frame and connected at its lower end to said slack adjuster, and an operative connection between the upper end of said slack adjuster lever and said dead cylinder lever.

11. In a brake arrangement for a railway car truck, a frame, spaced supporting wheel and axle assemblies, power means and slack adjuster means supported on one side of said frame at opposite ends thereof, and brake rigging comprising hanger levers supported outwardly of said wheels, live truck levers supported intermediate said wheels, straps connecting the levers associated with each wheel, live and dead cylinder levers connected to each other and connected to the live truck levers respectively, and operative connections between said live and dead cylinder levers and said power means and slack adjuster means respectively, the connection between said power means and said live cylinder lever comprising a dead auxiliary lever fulcrumed intermediate its ends from said frame and connected at its lower end to said power means, and a pull rod adjustably connected between said live cylinder lever and said auxiliary lever, and the connection between said slack adjuster means and said dead cylinder lever comprising a dead auxiliary lever fulcrumed intermediate its ends from said frame.

12. In a brake arrangement for a railway car truck, a frame, spaced supporting wheel and axle assemblies, power means and slack adjuster means supported on one side of said frame at opposite ends thereof, and brake rigging comprising hanger levers supported outwardly of said wheels, live truck levers supported intermediate said wheels, straps connecting the levers associated with each wheel, live and dead cylinder levers connected to each other and connected to the live truck levers respectively, and operative connections between said live and dead cylinder levers and said power means and slack adjuster means respectively, the connection between said live cylinder lever and said power means comprising a vertical auxiliary lever fulcrumed on the side of said frame and connected at its lower end to said power means, and a pull rod connected between said auxiliary lever and said live cylinder lever, and the connection between said dead cylinder lever and said slack adjuster means comprising a dead auxiliary lever movably fulcrumed from said frame and connected at its opposite ends to said slack adjuster means and said dead cylinder lever.

13. In a brake arrangement for a railway car truck, a frame comprising side members and end rails, spaced supporting wheel and axle assemblies, brackets suspended from the corners of said frame at opposite ends thereof, power means supported from said brackets at one end of said frame, slack adjuster means supported from said brackets at the opposite end of said frame, and brake rigging for each side of the car truck comprising hanger levers supporting brake heads and brake shoes outwardly of the wheels, hangers supporting live truck levers with brake heads and brake shoes intermediate the wheels, straps connecting the hanger levers and live truck levers associated with each wheel, and interconnected live and dead cylinder levers connected at their inboard ends to said live truck levers and operatively connected at their outboard ends respectively to said power means and slack adjuster means, the connection between said dead cylinder lever and said slack adjuster means comprising an auxiliary truck lever swingably fulcrumed from said frame intermediate its ends and connected at its opposite ends respectively to said slack adjuster means and to said dead cylinder lever.

14. In a brake arrangement for a railway car truck, a frame, spaced supporting wheel and axle assemblies, and braking means for each side of said truck comprising power means and slack adjuster means supported at opposite ends of the frame, live and dead levers supported at opposite sides of each wheel, straps connecting the levers for each wheel, and interconnected live and dead cylinder levers having their inboard ends connected to said live truck levers and their outboard ends operatively connected to said power means and slack adjuster means respectively, the operative connection between said slack adjuster means and said dead cylinder lever comprising a vertically disposed slack adjuster lever swingably fulcrumed intermediate its ends from said frame and adjustably connected at its lower end to said slack adjuster, and a pull rod adjustably connected between the upper end of said slack adjuster lever and said dead cylinder lever.

15. In a brake arrangement for a railway car truck, a frame, spaced supporting wheel and axle assemblies, power means and slack adjuster means supported on one side of said frame at opposite ends thereof, and brake rigging comprising hanger levers supported outwardly of said wheels, live truck levers supported intermediate said wheels, straps connecting the levers associated with each wheel, live and dead cylinder levers connected to each other and connected to the live truck levers respectively, and operative connections between said live and dead cylinder levers, and said power means and slack adjuster means respectively, the operative connection between said dead cylinder lever and said slack adjuster means comprising a dead auxiliary lever movably fulcrumed from said frame and connected at its opposite ends respectively to said slack adjuster means and said dead cylinder lever.

16. In a brake arrangement for a railway car truck, a frame, spaced supporting wheel and axle assemblies, and braking means for each side of said truck comprising power means and slack adjuster means supported at opposite ends of the frame, live and dead levers supported at opposite sides of each wheel, straps connecting the levers for each wheel, and interconnected live and dead cylinder levers having their inboard ends connected to said live truck levers and their outboard ends operatively connected to said power means and slack adjuster means respectively, the connection between said slack adjuster means and said dead cylinder lever comprising a vertically arranged auxiliary lever swingably fulcrumed from said frame.

17. In a brake arrangement for a railway car truck, a frame, spaced supporting wheel and axle assemblies, power means and slack adjuster means mounted on opposite corners of said frame at one side of said truck, and brake rigging comprising live and dead brake levers supported at opposite sides of each wheel, interconnected live and dead cylinder levers connected between said live brake levers and said power means and slack adjuster means respectively, the connection between said slack adjuster means and the associated cylinder lever comprising a vertically disposed auxiliary lever movably fulcrumed from said frame.

18. In a brake arrangement for a railway car truck, a frame, spaced supporting wheel and axle assemblies, power means and slack adjuster means mounted on opposite corners of said frame at one side of said truck, and brake rigging comprising live and dead brake levers supported at opposite sides of each wheel, interconnected live and dead cylinder levers connected between said live brake levers and said power means and slack adjuster means respectively, the connection between said slack adjuster means and the associated cylinder lever comprising a vertically disposed lever swingably fulcrumed intermediate its ends from said frame and operatively connected at its opposite ends to said last-mentioned cylinder lever and to slack adjuster means respectively.

19. In a brake arrangement for a railway car truck, a frame, spaced supporting wheel and axle assemblies, power means and slack adjuster means mounted on opposite corners of said frame at one side of said truck, and brake rigging comprising live and dead brake levers supported at opposite sides of each wheel, interconnected live and dead cylinder levers connected between said live brake levers and said power means and slack adjuster means respectively, the connection between said slack adjuster means and the associated cylinder lever comprising a dead auxiliary lever movably fulcrumed intermediate its ends from said frame and adjustably connected at its lower end to said slack adjuster means, and a pull rod connecting the upper end of said auxiliary lever with said last-mentioned cylinder lever.

20. In a brake arrangement for a railway car truck, a truck frame, spaced supporting wheel and axle assemblies, power means and slack adjuster means mounted at opposite corners of said frame on one side thereof, brake levers supported on opposite sides of each wheel at said side with said live levers intermediate the wheels, interconnected live and dead cylinder levers connected at their inner ends to said live brake levers respectively and operatively connected at their outer ends to said power means and slack adjuster means respectively, each of said last-mentioned operative connections comprising a vertically arranged dead auxiliary lever, one of said auxiliary levers being movably fulcrumed from said frame.

21. In a brake arrangement for a railway car truck, a truck frame, spaced supporting wheel and axle assemblies, power means and slack adjuster means mounted at opposite corners of said truck on one side thereof, brake levers supported on opposite sides of each wheel at said side of the truck with said live levers connected at their inner ends to said live brake levers respectively and operatively connected at their outer ends to said power means and slack adjuster means respectively, each of said last-mentioned operative connections comprising a vertically arranged dead auxiliary lever, the auxiliary lever associated with said slack adjuster means being swingably fulcrumed intermediate its ends from said frame and operatively connected at its opposite ends respectively to said slack adjuster means and to said dead cylinder lever.

NORMAN FLESCH.